Feb. 4, 1969 B. H. DANN 3,426,284

TRANSISTORIZED DEMODULATOR CIRCUIT FOR TIME MODULATED SIGNALS

Filed Aug. 8, 1966

INVENTOR.
BERT H. DANN
BY
Christie, Parker & Hale
ATTORNEYS.

United States Patent Office 3,426,284
Patented Feb. 4, 1969

3,426,284

TRANSISTORIZED DEMODULATOR CIRCUIT FOR TIME MODULATED SIGNALS

Bert H. Dann, Altadena, Calif., assignor to Bell & Howell Company, Chicago, Ill., a corporation of Illinois Filed Aug. 8, 1966, Ser. No. 570,886
U.S. Cl. 329—101 2 Claims
Int. Cl. H03d *1/18*

The present invention relates to demodulator circuits and, more particularly, is concerned with a circuit for demodulating time demodulated signals.

In copending application Ser. No. 484,705, filed Sept. 2, 1965, in the name of the same inventor as the present application, there is described an improved circuit for demodulating time modulated signals, particularly useful in demodulating frequency modulated video signals recorded on magnetic tape. Because of the band width limitations in magnetic recording, the frequency deviation of the frequency modulated signal derived from the tape may be large in relation to the carrier frequency. Rather than the usual discriminator circuit, pulse averaging demodulator techniques are preferable in demodulating such recorded signals. The circuit described in the above-described patent application is particularly effective in generating constant area pulses at both the positive-going and negative-going zero crossings of the modulated carrier signal derived from the magnetic tape. These pulses are then applied to an averaging circuit in the form of a low-pass filter to reproduce the modulating component which is the video signal.

The present invention is directed to a similar type of demodulator circuit which gives improved performance with less expensive components than other known demodulator circuits of this type. One advantage of the present circuit is that it is capable of demodulating signals in which the modulation component may go to and include zero frequency, i.e., to DC.

In brief, the circuit of the present invention includes first and second transistors in which the emitters are connected to a common potential source through relatively large emitter load resistors. The collectors in turn are connected through a much smaller load resistance to the other end of the potential source. The bases of the first and second transistors are biased such that the transistors are normally conductive. Third and fourth transistors are connected with their emitters respectively connected to the emitters of the first and second transistors. The collectors are connected to the potential source while the modulated input signal is used to alternately pulse the base electrodes of the third and fourth transistors to alternately turn on the third and fourth transistors. A capacitor is connected between the emitters of the first and second transistors. The circuit is arranged so that when either of the third or fourth transistors is turned on, the first and second transistors are both turned off, whereas if neither the third nor fourth transistors is turned on, both the first and second transistors are turned on. By this arrangement, the output current changes linearly with the frequency of the input.

For a more complete understanding of the invention, reference should be made to the accompanying drawings wherein.

Figure 1:
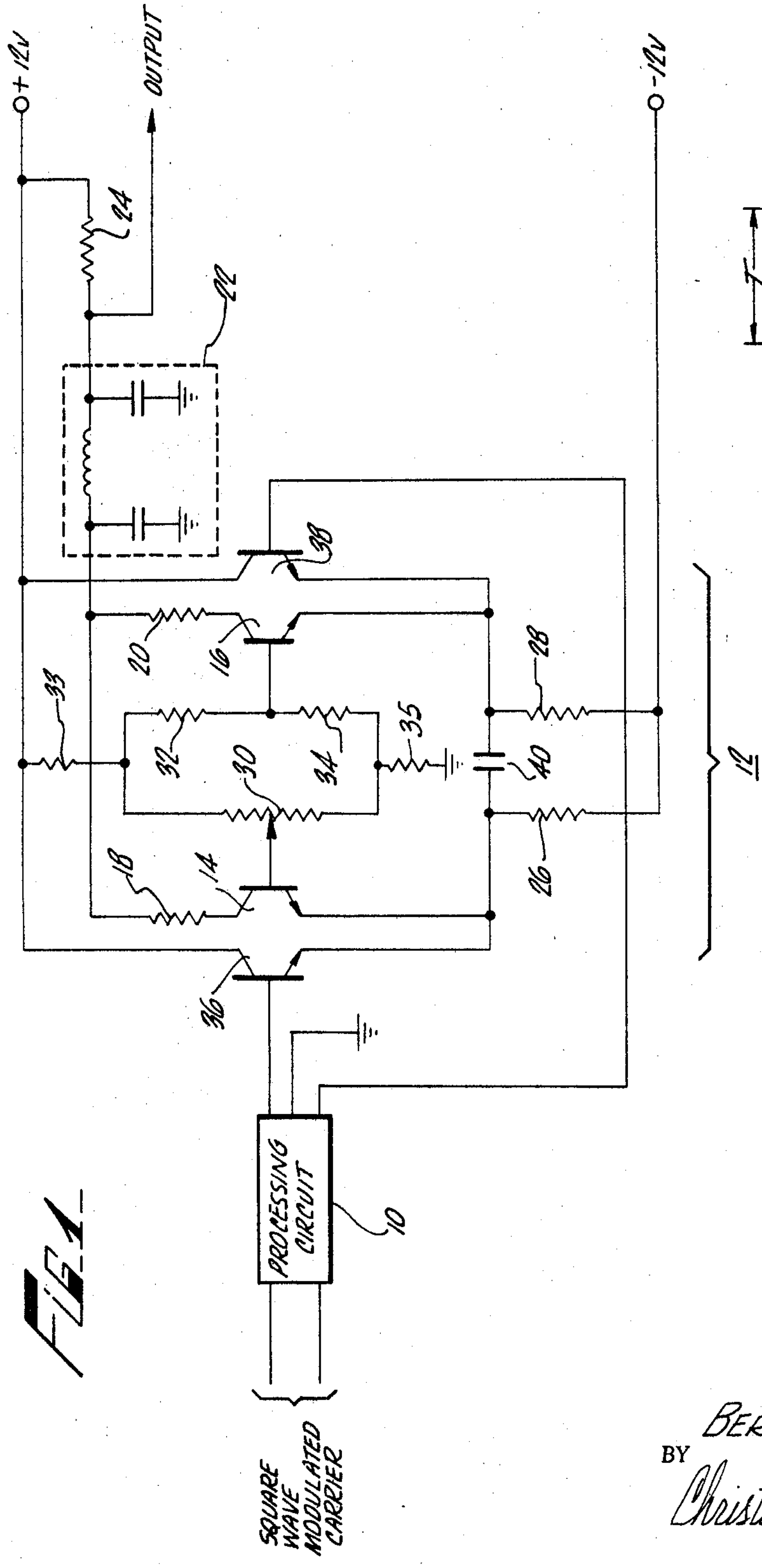
FIGURE 1 is a schematic circuit diagram of the demodulator circuit.
Figure 2:
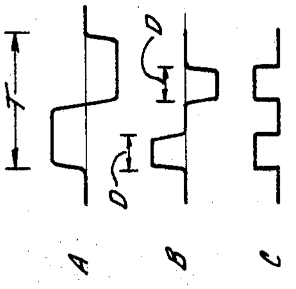
FIGURE 2 is a series of waveforms useful in explaining the operation of the circuit of FIGURE 1.

The modulated input signal, after suitable limiting, corresponds to the waveform A of FIGURE 2. The period T varies as a function of the modulation. The modulated carrier signal is applied to a processing circuit indicated generally at 10 in FIGURE 1, the function of which is to modify the modulated signal so as to provide pulses of constant time duration D coincident with each half cycle of the input signal. A suitable processing circuit is described in detail in the above-mentioned copending application. The waveform of the output of the processing circuit is shown at B in FIGURE 2.

The processing circuit 10 provides a double-ended output which is applied to the demodulating circuit indicated generally at 12. The demodulating circuit includes first and second NPN type transistors 14 and 16. The collectors of the transistors 14 and 16 are connected together through small resistors 18 and 20 respectively, which in turn are connected by a low-pass filter, indicated generally at 22, and a common load resistor 24 to a positive potential source (not shown). The waveform of the output filter 22 is shown at C in FIGURE 2. The resistors 18 and 20 serve to suppress any parasitic oscillations. The emitters of the transistors 14 and 16 are respectively connected through relatively large emitter load resistors 26 and 28 to a negative potential source (not shown).

A bias circuit which permits individual adjustment of the bias level on the base electrodes of the transistors 14 and 16 includes a potentiometer 30 connected in parallel with a pair of resistors 32 and 34, which in turn are connected between the positive potential source and ground through series resistors 33 and 35. The base of the transistor 14 is connected to the variable tap of the potentiometer 30, while the base of the transistor 16 is connected to the junction point between the resistors 32 and 34. The bias level is such that both the transistors 14 and 16 are normally conductive.

Third and fourth transistors, indicated at 36 and 38 respectively, are connected as emitter followers, with the collectors connected to the positive potential source and the emitters connected to the emitters of the transistors 14 and 16 respectively. The output of the processing circuit 10 is connected between the base electrodes of the transistors 36 and 38. A capacitor 40 is preferably connected between the emitters of the transistors 14 and 16.

Typical values of the circuit components are given below:

| | Ohms |
|---|---|
| Resistors **18** and **20** | 100 |
| Resistor **24** | 250 |
| Resistors **26** and **28** | 2210 |
| Resistors **32** and **34** | 50 |
| Resistor **33** | 2200 |
| Resistor **35** | 27 |
| Potentiometer **30** | 100 |

Considering the operation of the circuit of FIGURE 1, in the absence of the capacitor 40, each transistor pair acts as an emitter-coupled clipper. Thus when the transistor 36 is turned on during the interval D of the output of the processing circuit 10, the transistor 14 is turned off. Similarly, when the transistor 38 is turned on by the other interval D of each signal period T. The transistor 16 is turned off. Therefore the average collector current of the transistors 14 and 16 may be expressed as $$I_c=I_e(1-D/T)$$

where $I_e$ is the emitter current in each transistor pair and is roughly equal to the voltage of the negative source divided by the resistance value of the emitter resistor 26 or 28. Since the output current $I_o$ through the common load resistor 24 is the sum of the collector currents, the output current can be expressed as $$I_o=2I_e(1-D/T)=2I_e-2I_eDf$$

where the frequency $f=1/T$. Hence the change in output current as a function of frequency may be expressed as $dI_o/df=-2I_eD$.

With the capacitor 40 added, when the transistor 36 conducts, all other transistors are turned off. Similarly, when the transistor 38 conducts all other transistors are turned off. When neither transistor 36 nor 38 is conducting, transistors 14 and 16 conduct a total current of $2I_e$ (note that this assumes that the base currents are negligible). Thus the expression for the output current becomes $I_o=2I_e(1-2D/T)=2I_e-4I_eDf$. Therefore the change in output current with frequency becomes $$dI_o/df=-4I_eD$$

It will therefore be seen that with the capacitor 40 present, twice the output current variation for a given frequency change is provided.

In addition, without the capacitor 40 present, any condition resulting in a difference in the level of collector current in the transistors 14 and 16 when conducting produces a ripple at the period frequency in the output. However, with the capacitor 40 present, since the transistors 14 and 16 both conduct simultaneously, inequality in the respective collector currents is of no consequence. Thus the capacitor 40 provides excellent carrier suppression in spite of component variations.

It should be noted that the capacitor 40 must have a low reactance at the lowest carrier frequency but need not have low reactance at the lowest modulatinv frequency. In fact, the circuit provides demodulation down to DC.

Another advantage of the circuit as described, is that any ripple appearing at the peak of the pulses at the output of the processing circuit 10 can not appear in the output because the transistors 14 and 16 are turned off during the pulse interval D. Likewise, any ripple appearing in the base line of the signal at the output of the processing circuit 10 does not appear in the output because the transistors 36 and 38 are turned off during this period. Thus, in effect, the output is disconnected from the input except during a very brief interval during which the transistors 36 and 38 go into and out of conduction.

What is claimed is:

1. A demodulator for a time modulated input signal comprising first and second transistors, each having an emitter, collector and base, means connecting the collectors through a common load impedance to one end of a potential source, first and second resistors respectively connecting the emitters to the other end of said source, means for applying a bias on the respective bases to bias the transistors to a conductive state, third and fourth transistors each having an emitter, collector and base, the emitter of the third transistor being connected to the emitter of the first transistor and the emitter of the fourth transistor being connected to the emitter of the second transistor, means connecting the collectors of the third and fourth transistors to said one end of the potential source, and means responsive to the time modulated signal for alternately pulsing the bases of the third or fourth transistors into a conductive state, the bias on the first and second transistor bases being such that when one of the third and fourth transistors is conducting the associated one of the first and second transistors is turned off.

2. Apparatus as defined in claim 1 further including a capacitor connected between the emitters of the first and second transistors, the capacitor having a low reactance at the carrier frequency of the modulated input signal.

References Cited

UNITED STATES PATENTS

| | | | |
|---|---|---|---|
| 2,827,611 | 3/1958 | Beck | 329—101 |
| 3,225,209 | 12/1965 | Schuster | 330—15 X |
| 3,328,710 | 6/1967 | Baldwin | 332—43 X |

ALFRED L. BRODY, *Primary Examiner.*

U.S. Cl. X.R.

329—192; 332—43; 330—15; 307—235